A. J. H. KUHSIEK.
BUMPER ATTACHING BRACKET.
APPLICATION FILED MAY 26, 1917.
1,329,667.
Patented Feb. 3, 1920.
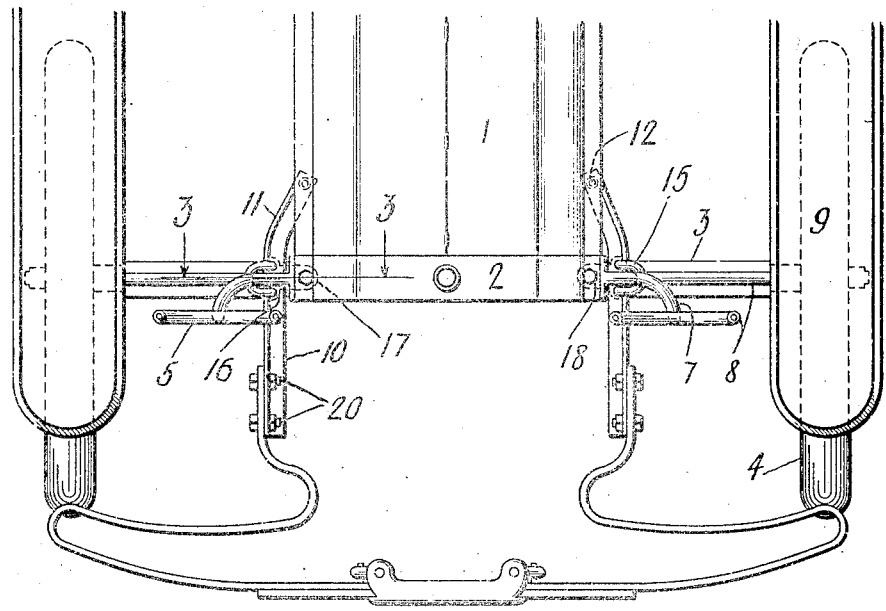
FIG. 1
FIG. 2
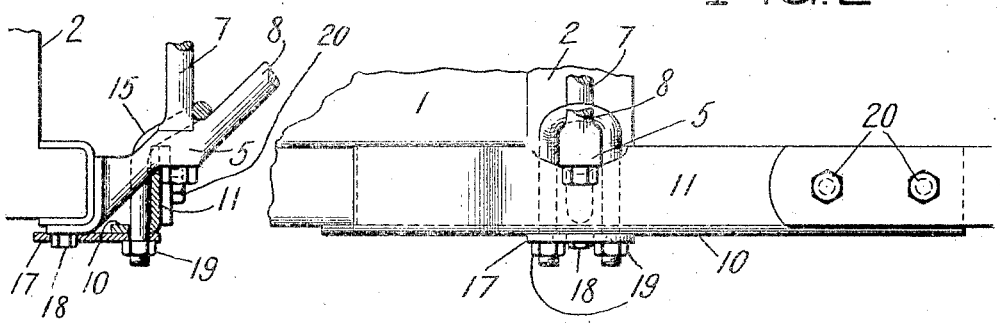
FIG. 3
Albert J. H. Kuhsiek, Inventor
By his Attorney

UNITED STATES PATENT OFFICE.

ALBERT J. H. KUHSIEK, OF NEW YORK, N. Y., ASSIGNOR TO EDWARD V. HARTFORD INC., A CORPORATION OF NEW YORK.

BUMPER-ATTACHING BRACKET.

1,329,667.  Specification of Letters Patent.  Patented Feb. 3, 1920.

Application filed May 26, 1917. Serial No. 171,114.

*To all whom it may concern:*

Be it known that I, ALBERT J. H. KUHSIEK, a citizen of the United States, residing at Richmond Hill, in the county of Queens, city and State of New York, have invented certain new and useful Improvements in Bumper-Attaching Brackets, of which the following, taken in connection with the accompanying sheet of drawings, is a full, clear, and concise description thereof.

This invention relates to an automobile bumper bracket and particularly to a form of bracket especially applicable to a well known type of automobile.

An object of the invention is the provision of a bumper bracket characterized by simplicity of construction and which is easily affixed to a car in a rigid manner.

Another object is the provision of a bumper fastening means substantially designed for supporting a bumper in the front of a car of the type in which the suspension member is mounted transversely of the chassis frame, or when the side members of the frame of the vehicle terminate substantially in the perpendicular plane of the radiator.

A further object of the invention is the provision of a bumper bracket which is adapted to coöperate with certain installed accessories, such as the lamp brackets, which comprise part of the customary equipment of a car.

A still further object is the provision of a bumper attaching means so constructed that when attached it is adapted to accommodate and support any standard form of spring type bumper. This is effected by giving the bracket members such a conformation as to have a width at their supporting ends approximating the width of the space separating the attaching portions of a bumper.

While this invention has been set forth in one preferred embodiment, it will be understood that modifications may be made without departure from the scope and spirit thereof.

The invention is illustrated in the accompanying drawing, in which—

Figure 1 is a plan view of a part of the front of an automobile showing my bracket applied to the chassis frame and supporting a common form of spring type bumper.

Fig. 2 is a side elevation with parts broken away showing the manner in which the lamp bracket is utilized in partly supporting the bracket member; and Fig. 3 is a section taken on the line 3—3 of Fig. 1.

In Fig. 1 of the drawing there is shown the front part of an automobile including the customary hood 1, radiator 2, and suspension member 3, carried by the wheels 4. Lamp brackets 5 positioned upon each side of the radiator 2 and fastened at the point of intersection of the channel members of the chassis frame extend upwardly and outwardly and are bifurcated at a point intermediate their ends, said bifurcated portion terminating in arms 7 and 8. Each of the arms 7 is provided with a bifurcated portion suitable to mount a lamp on, while the arms 8 extend upwardly and outwardly and support at their extremities the front ends of fenders or mud guards 9.

A pair of bumper bracket members 10 preferably made from pieces of angle iron and being L-shaped in cross-section have an angularly disposed portion 11 adjacent one of their sides. Each of the bracket members 10 is mounted so that one face or surface thereof lies in a horizontal plane and the other in a vertical plane. An aperture 12 is provided in the horizontal portions adjacent the end of the angularly disposed portion 11 of each of the members 10, whereby they may be fastened to the longitudinal channel members of the chassis frame. It will be noted that the angular displacement of the portions 11 is such as to make the body portion of the members 10 parallel to and spaced from the longitudinal channel members of the frame. To permit the fastening of the members 10 to the channel members, the corners of the vertical edges or sides of said members are removed, allowing the horizontal faces thereof to extend a substantial distance under the lower surface of the chassis frame, and be secured thereto in any suitable manner, such as by bolting, riveting and the like. A U-shaped bolt 15 having its closed end bent at an angle to its open ends (see Fig. 3) is associated with each of the bracket members 10. The closed end of the bolt 15 is adapted to be seated in the bifurcated portion of the lamp brackets 5 and has its free ends extending downwardly in a vertical plane, to be received in apertures 16 made in the horizontal portion of each of bracket members 10. As supplemental supporting members, plates 17 are provided, each substantially T-shaped, having their corners rounded off, the heads thereof being provided with apertures adapted to coöperate with the corresponding ones made in the bracket members 10. The tail portion of the plate 17 extends inwardly and is secured to the channel member of the chassis frame by means of a bolt 18. By tightening nuts 19 the bolt 15 may be drawn into place and through the coöperation of engaging parts will rigidly support the bracket member 10 intermediate its ends. The outer end of each of the bracket members 10 is provided with recesses adapted to aline with corresponding recesses provided on the attaching portion of a bumper and permitting the fastening of said bumper thereto by means of bolts 20.

From the above it will be seen that the bracket contemplated by my invention is easily secured in place and when installed rigidly supports any standard form of bumper.

While I have herein shown and particularly described the preferred embodiment of my invention, I do not wish to be limited to the precise details of construction illustrated, as changes may be made without departing from the spirit and scope of my invention.

I claim:

1. In a bumper attaching bracket, the combination with a motor vehicle chassis having a frame and a lamp bracket, of an attaching member having one of its ends adapted to be secured to the chassis frame, and means for supporting said member intermediate its ends, said means including a U-shaped bolt adapted to fit over said lamp bracket, and a plate provided with spaced apertures adapted to receive the ends of said bolt, said plate being provided with an extending portion suitable for engagement with the chassis frame.

2. In a bumper attaching bracket, the combination with a motor vehicle chassis having a frame and a lamp bracket, of an attaching member L-shaped in cross section, said member having a portion adjacent one of its ends bent at an angle to its body portion, the end of said angular portion being secured to the chassis frame, said member being supported intermediate its ends by a U-shaped bolt adapted to be seated in the fork of the lamp bracket and provided with apertures spaced apart and adapted to accommodate the ends of said bolt, and a plate adapted to fit over the ends of said bolt and having an extension adapted to be secured to the frame, whereby said bracket member is rigidly fastened to the chassis.

3. A bracket for supporting a bumper from the frame of a motor vehicle comprising a supporting member, said supporting member being L-shaped in cross section and provided with an angularly displaced end portion, said end portion being adapted to be secured to the frame, a U-shaped member adapted to be fastened intermediate the ends of said supporting member, and means for attaching the bumper to said supporting member, whereby said member will constitute a physical continuation of the end of said bumper.

4. In a bumper attaching bracket, the combination with a motor vehicle chassis having a frame and a lamp bracket, of an attaching member made from a piece of angle iron, and having one of its ends angularly displaced, the displaced end of said member being adapted to be secured to the frame, the portion intermediate the ends of said member being adapted to be supported by a U-shaped bolt coöperating with the lamp bracket, a plate adapted to fit over the ends of said bolt and having an extending portion adapted to be fastened to the frame, the free end of said member being provided with spaced apertures suitable to accommodate bolts for securing the attaching portion of a bumper.

5. In a bumper attaching bracket, the combination with a motor vehicle chassis having a frame and a lamp bracket, of an attaching member L-shaped in cross section and provided with an angularly disposed end portion, a part of the perpendicular side of said member being cut away adjacent to one end of said member, whereby said end will lie against the underside of the vehicle frame and the contiguous portion of the perpendicular part of said member abut against the side of the frame, means for connecting said member to the lamp bracket intermediate of its ends, whereby the upper part of the perpendicular portion of said member will be drawn into rigid engagement with the underside of said lamp bracket, and means for locking said attaching member against longitudinal and lateral movement.

6. A bracket for supporting a bumper from the frame of a motor vehicle, comprising a supporting member, said supporting member being L-shaped in cross section and provided with an angularly disposed end portion, a part of said member being cut away to provide surfaces adapted to lie against the bottom and side faces of the adjacent frame member respectively, means for fastening said angularly disposed end portion to the frame member, fastening means positioned intermediate of the ends of said supporting member, and means for attaching a bumper to said member, whereby said bumper will constitute a physical continuation of the end of said member.

ALBERT J. H. KUHSIEK.